(12) United States Patent
Pavan et al.

(10) Patent No.: US 11,260,455 B2
(45) Date of Patent: Mar. 1, 2022

(54) ENERGY DENSITY MAPPING IN ADDITIVE MANUFACTURING ENVIRONMENTS

(71) Applicant: MATERIALISE N.V., Leuven (BE)

(72) Inventors: Michele Pavan, Leuven (BE); Piet Van Den Ecker, Leuven (BE); Tom Craeghs, Leuven (BE)

(73) Assignee: Materialise N.V., Leuven (BE)

( * ) Notice: Subject to any disclaimer, the term of this patent is extended or adjusted under 35 U.S.C. 154(b) by 214 days.

(21) Appl. No.: 16/337,083

(22) PCT Filed: Sep. 26, 2017

(86) PCT No.: PCT/US2017/053516
§ 371 (c)(1),
(2) Date: Mar. 27, 2019

(87) PCT Pub. No.: WO2018/064066
PCT Pub. Date: Apr. 5, 2018

(65) Prior Publication Data
US 2020/0038953 A1    Feb. 6, 2020

Related U.S. Application Data

(60) Provisional application No. 62/400,392, filed on Sep. 27, 2016.

(51) Int. Cl.
| | |
|---|---|
| *B22F 10/20* | (2021.01) |
| *B29C 64/153* | (2017.01) |
| *B29C 64/393* | (2017.01) |
| *B29C 64/135* | (2017.01) |
| *B33Y 10/00* | (2015.01) |
| *B33Y 50/02* | (2015.01) |
| *B22F 10/30* | (2021.01) |

(52) U.S. Cl.
CPC ............ *B22F 10/20* (2021.01); *B29C 64/135* (2017.08); *B29C 64/153* (2017.08);
(Continued)

(58) Field of Classification Search
CPC .......... B22F 10/20; B22F 10/30; B22F 10/10; B22F 10/00; B29C 64/153; B29C 64/393;
(Continued)

(56) References Cited

U.S. PATENT DOCUMENTS

| | | | |
|---|---|---|---|
| 6,562,278 B1* | 5/2003 | Farnworth | B33Y 30/00 264/401 |
| 2013/0168902 A1* | 7/2013 | Herzog | B29C 64/393 264/401 |

(Continued)

FOREIGN PATENT DOCUMENTS

| | | |
|---|---|---|
| CN | 104190930 A | 12/2014 |
| CN | 104821248 A | 8/2015 |

(Continued)

OTHER PUBLICATIONS

Office Action dated Nov. 26, 2020 of Chinese Application No. 201780072219.4.
(Continued)

*Primary Examiner* — Nahida Sultana
(74) *Attorney, Agent, or Firm* — Patterson + Sheridan, LLP

(57) ABSTRACT

Systems and methods for generating an energy density map of an object to be built in an additive manufacturing environment are provided. Certain embodiments provide a method for building an object utilizing additive manufacturing, the method including: receiving a job file for building the object, wherein the job file includes a plurality of slices of the object, and wherein a first slice of the object indicates scanning lines for applying an energy source to build material to build the first slice of the object; determining operation parameters of the energy source; and generating a first energy density map of the first slice of the object based on the job file and the operation parameters of the energy source, wherein the first energy density map indicates an (Continued)

amount of energy from the energy source per area of build material applied to the build material for the first slice of the object.

14 Claims, 10 Drawing Sheets

(52) U.S. Cl.
CPC ............ *B29C 64/393* (2017.08); *B22F 10/30* (2021.01); *B33Y 10/00* (2014.12); *B33Y 50/02* (2014.12)

(58) Field of Classification Search
CPC ..... B29C 64/135; B29C 64/268; B33Y 10/00; B33Y 50/02; Y02P 10/25
See application file for complete search history.

(56) References Cited

U.S. PATENT DOCUMENTS

| | | | |
|---|---|---|---|
| 2015/0088292 A1 | 3/2015 | Inoue et al. | |
| 2016/0059352 A1 | 3/2016 | Sparks | |
| 2016/0288413 A1* | 10/2016 | Yakubov | B33Y 10/00 |
| 2017/0246682 A1* | 8/2017 | Duerig | A61F 2/4455 |
| 2018/0239335 A1* | 8/2018 | Barr | B23K 15/0086 |
| 2020/0276669 A1* | 9/2020 | Dardis | B23K 15/0013 |
| 2020/0307104 A1* | 10/2020 | Hunze | B33Y 30/00 |
| 2020/0376555 A1* | 12/2020 | Casper | B33Y 50/02 |

FOREIGN PATENT DOCUMENTS

| | | |
|---|---|---|
| DE | 10 2009 015 282 A1 | 5/2014 |
| EP | 1466718 A2 | 10/2004 |
| EP | 1815 936 A1 | 8/2007 |
| WO | 2016026706 A1 | 2/2016 |

OTHER PUBLICATIONS

Office Action dated Oct. 5, 2021 of Japanese Patent Application No. 2019-516538.
Guo, Huafeng, 3D Finite Element Simulation of the Temperature Field and Experiment Study on Direct Metal Laser Sintering, Chinese Doctoral Dissertation & Master's Theses Full-text Database (Master), Engineering Science & Technology 1, pp. B023-18, Nov. 15, 2007.
Office Action dated Oct. 27, 2021 for Chinese Application No. 201780072219.4.

* cited by examiner

ENERGY DENSITY MAPPING IN ADDITIVE MANUFACTURING ENVIRONMENTS

BACKGROUND OF THE INVENTION

Field of the Invention

This application relates to the spatial energy distribution for building an object in an additive manufacturing environment. More particularly, this application relates to systems and methods for generating an energy density map of an object to be built in an additive manufacturing environment.

Description of the Related Technology

Scanning systems (e.g., laser scanning systems, electron beam scanning systems, etc.) are used in many different applications. One of these applications is the field of additive manufacturing, in which three dimensional solid objects are formed based on a digital model. Because the manufactured objects are three dimensional, additive manufacturing is commonly referred to as three dimensional ("3D") printing. The use of a scanning system in additive manufacturing is especially prevalent in stereolithography, laser sintering ("LS"), and laser melting manufacturing techniques. These techniques use scanning systems to direct an energy source (e.g., laser beam, electron beam, etc.) to a specified location in order to polymerize or solidify layers of build materials which are used to create the desired three dimensional ("3D") object.

In processes that produce objects such as sintering, the energy source of the scanning system provides energy needed to polymerize, sinter, or melt layers of the building material. The heating and providing of energy to polymerize or solidify layers of the building material may affect different aspects of the produced object.

SUMMARY

Certain embodiments of this disclosure provide a method for building an object utilizing additive manufacturing, the method comprising: receiving a job file for building the object, wherein the job file includes a plurality of slices of the object, and wherein a first slice of the object indicates scanning lines for applying an energy source to build material to build the first slice of the object; determining operation parameters of the energy source; and generating a first energy density map of the first slice of the object based on the job file and the operation parameters of the energy source, wherein the first energy density map indicates an amount of energy from the energy source per area of build material applied to the build material for the first slice of the object.

Certain embodiments of this disclosure provide an apparatus for building an object utilizing additive manufacturing, the apparatus comprising: a memory; and a processor configured to: receive a job file for building the object, wherein the job file includes a plurality of slices of the object, and wherein a first slice of the object indicates scanning lines for applying an energy source to build material to build the first slice of the object; determine operation parameters of the energy source; and generate a first energy density map of the first slice of the object based on the job file and the operation parameters of the energy source, wherein the first energy density map indicates an amount of energy from the energy source per area of build material applied to the build material for the first slice of the object.

Certain embodiments of this disclosure provide an apparatus for building an object utilizing additive manufacturing, the apparatus comprising: means for receiving a job file for building the object, wherein the job file includes a plurality of slices of the object, and wherein a first slice of the object indicates scanning lines for applying an energy source to build material to build the first slice of the object; means for determining operation parameters of the energy source; and means for generating a first energy density map of the first slice of the object based on the job file and the operation parameters of the energy source, wherein the first energy density map indicates an amount of energy from the energy source per area of build material applied to the build material for the first slice of the object.

Certain embodiments of this disclosure provide a computer-readable storage medium having instructions stored thereon for performing a method for building an object utilizing additive manufacturing, the method comprising: receiving a job file for building the object, wherein the job file includes a plurality of slices of the object, and wherein a first slice of the object indicates scanning lines for applying an energy source to build material to build the first slice of the object; determining operation parameters of the energy source; and generating a first energy density map of the first slice of the object based on the job file and the operation parameters of the energy source, wherein the first energy density map indicates an amount of energy from the energy source per area of build material applied to the build material for the first slice of the object.

DETAILED DESCRIPTION OF CERTAIN INVENTIVE EMBODIMENTS

Figure 1:
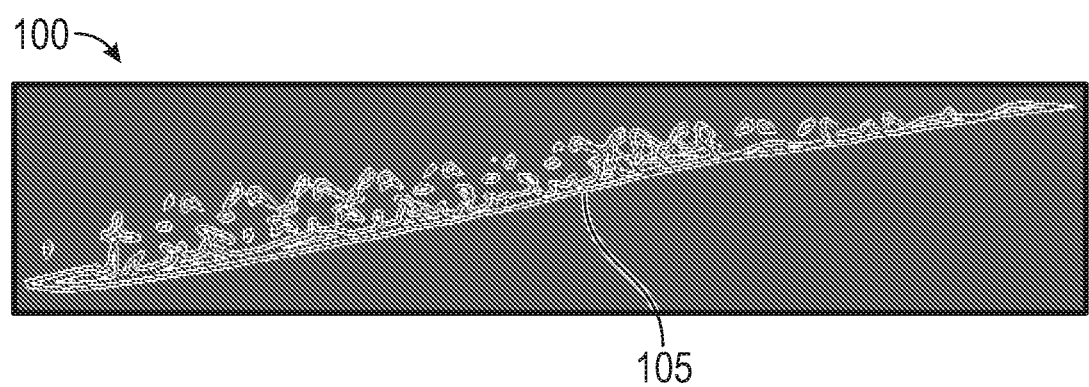
FIG. 1 illustrates an example of a scanning pattern corresponding to a layer of an object.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments.

The systems and methods described herein may be performed using various additive manufacturing and/or three-dimensional (3D) printing systems and techniques. Typically, additive manufacturing techniques start from a digital representation of the 3D object to be formed. Generally, the digital representation is divided into a series of cross-sectional layers, or "slices," which are overlaid to form the object as a whole. The layers represent the 3D object, and may be generated using additive manufacturing modeling software executed by a computing device. For example, the software may include computer aided design and manufacturing (CAD/CAM) software. Information about the cross-sectional layers of the 3D object may be stored as cross-sectional data. An additive manufacturing (e.g., 3D printing) machine or system utilizes the cross-sectional data for the purpose of building the 3D object on a layer by layer basis. Accordingly, additive manufacturing allows for fabrication of 3D objects directly from computer generated data of the objects, such as computer aided design (CAD) files or STL files. Additive manufacturing provides the ability to quickly manufacture both simple and complex parts without tooling and without the need for assembly of different parts.

Additive manufacturing processes generally include providing energy from an energy source (e.g., a laser, an electron beam, etc.) to solidify (e.g., polymerize) layers of building material (e.g., plastic, metal, etc.). For example, the additive manufacturing machine may selectively apply energy from an energy source to (e.g., scan) the building material based on a job file. The job file may include information regarding slices of a digital representation of an object to be built using an additive manufacturing process. For example, for each slice, the job file may include information regarding a scanning pattern for the energy source to apply energy to (e.g., laser to scan, electron beam to scan, etc.) the physical layer of building material corresponding to that slice. It should be noted that as discussed herein, the terms slice and layer may be used interchangeably. The scanning pattern may include one or more vectors that each indicates a spatial position to apply the energy to the layer of building material and a direction to apply the energy to the building material (e.g., a direction to move the laser beam, electron beam, or other energy source over the building material while scanning).

An additive manufacturing machine builds an object on a layer by layer basis by applying energy to (e.g., scanning) the layers of building material according to the scanning pattern for each individual layer as indicated in a job file. For example, the additive manufacturing machine may scan a first layer of physical building material corresponding to a first slice of a digital representation of an object according to the scanning pattern for the first slice. The additive manufacturing machine may then scan a second layer of building material corresponding to a second slice adjacent to the first slice according to the scanning pattern for the second slice. The additive manufacturing machine continues scanning layers of building material corresponding to all the slices in the job file, until the layer corresponding to the last slice is scanned.

During the scanning process, energy is applied from the energy source to the building material on a layer by layer basis to build the object on a layer by layer basis. In some aspects, some sections or areas of an object may receive a different amount of energy than other sections of the object. For example, different sections or areas of different layers of building material may receive different amounts of energy. These different amounts of energy applied to different sections of a layer of an object may affect the final built object. For example, a quality of different sections of the object, such as a strength, thickness, porosity, size, shape, finish, etc. may be based on the amount of energy applied to the sections. Therefore, control of the amount of energy applied to the building material during the build process of an object may affect the overall quality of the final build object.

For example, when the amount of energy applied to an object leads to porosity, this will also likely affect material properties such as mechanical strength, stiffness or fatigue life. In a region of the object where energy density is low, the raw material may not sinter or melt completely, and thus porosity may be present. In a region of the object where the energy density is high, porosity may be present either due to degradation of the material at high temperatures and/or formation of new types of porosity such as keyhole porosity. A region of high porosity may be structurally weak and/or vulnerable to fatigue.

In some embodiments, the amount of energy applied to or contained in a unit of building material is its energy density. The amount of energy may be considered per unit volume, per unit area, or per unit of measure in 1D, 2D or 3D space. The quantity of energy may be in a slice of the object, or in a portion of the slice. The quantity of energy may be in a subset of slices, for example, in a given slice as well as one or more slices positioned directly above and/or one or more slices positioned directly below. Energy density may be calculated from any of these geometries or from any unit of space. Energy density may be actual energy density in a given space, or may be a simulated energy density based on models. In some embodiments, one or more variations of energy density are calculated, such as cumulative energy density, maximum energy density, minimum energy density, mean energy density, or average energy density.

Accordingly, certain embodiments herein provide systems and methods for generating energy density maps for an object to be built in an additive manufacturing environment. For example, an energy density map may be generated for each slice of a digital representation of an object (e.g., job file). The energy density map may indicate an amount of energy (e.g., estimated amount of energy or actually applied energy) applied to a layer of build material from the energy source per area of the layer of build material when manufacturing the layer of the object.

In some embodiments, the energy density map is used to identify critical sections (e.g., sections with potential for errors when building, which may be referred to as a non-conformity) of the object (e.g., areas or volumes), or the probability that a section has an error or non-conformity. For example, the energy density map may be used to identify sections of the object that may not be of sufficient quality (e.g., voids in the object, are misshapen, weak, high porosity, etc.). In some embodiments, the energy density map may be used to estimate or determine sections with geometrical non-conformities (e.g., differences between the actual resulting dimensions of the built object, and the dimensions of the digital representation of the object). In some embodiments, the energy density map is used to optimize building of the object. For example, application of energy from the energy source to the build material at identified critical sections of the object may be adjusted. For example, the scanning pattern, power level of the energy source, speed the energy source is moved while scanning, beam shape from the energy source, and/or beam diameter from the energy source may be adjusted. In some embodiments, the scanning pattern may be adjusted by modifying the job file (e.g., including more or fewer scanning lines) at identified critical sections of the object. In some embodiments, the application of energy from the energy source to the build material at identified critical sections may be modified in an automated fashion. Accordingly, the generation of an energy density map may advantageously allow for enhanced control of additive manufacturing processes, and lead to a higher quality for objects built using additive manufacturing processes.

Selective laser sintering (LS) is an additive manufacturing technique used for 3D printing objects. LS apparatuses often use a high-powered laser (e.g. a carbon dioxide laser) to "sinter" (i.e. fuse) small particles of plastic, metal, ceramic, glass powders, or other appropriate materials into a 3D object. The LS apparatus may use a laser to scan cross-sections on the surface of a powder bed in accordance with a CAD design or job file. Also, the LS apparatus may lower a manufacturing platform by one layer thickness after a layer has been completed and add a new layer of material in order that a new layer can be formed. In some embodiments, an LS apparatus may preheat the powder in order to make it easier for the laser to raise the temperature during the sintering process. Though embodiments described herein may be described with respect to LS, the embodiments may also be used with other appropriate additive manufacturing techniques as would be understood by one of ordinary skill in the art.

FIG. 1 illustrates an example of a scanning pattern 100 corresponding to a layer of an object. For example, the scanning pattern 100 is for a slice of a digital representation of the object corresponding to the layer of the object. The slice may be one of a plurality of slices that are part of a job file used by an additive manufacturing machine to build the object. As shown, the scanning pattern 100 includes a set of lines 105. The lines 105 of the scanning pattern 100 indicate to the additive manufacturing machine where to apply energy from an energy source to build material corresponding to the layer of the object. For example, the additive manufacturing machine may scan an energy source (e.g., a laser beam, electron beam, etc.) over a layer of build material in a pattern matching the lines 105 of the scanning pattern 100. In some aspects, the lines 105 include vectors. The vectors of the lines 105 indicate a spatial position to apply the energy to the layer of building material and a direction to move the energy source and apply the energy to the building material (e.g., a direction to move the laser beam, electron beam, or other energy source over the building material while scanning).

In some embodiments, a computing device may store and access a job file for an object. As discussed, the job file includes a digital representation of the object. The digital representation of the object may include a plurality of slices corresponding to layers of the object. Each of the slices may include a scanning pattern such as the scanning pattern 100. In some embodiments, the computing device is configured to generate an energy density map for each layer of the object based on the corresponding slice in the job file for the object.

In some embodiments, the computing device generates an energy density map for a layer of an object based on the scanning pattern for the layer (e.g., in a job file) and operating parameters of the energy source of the additive manufacturing machine used to build the object. For example, the operating parameters (e.g., for a laser beam) may include one or more of a power of the energy source, a scanning speed of the energy source, a size (e.g., diameter) of a beam emitted from the energy source, and a shape of a beam emitted from the energy source. In some aspects, such as where the energy source includes an electron beam, the operating parameters may include one or more of a power of the energy source, a scanning speed of the energy source, an accelerating voltage, and a current of the energy source. As discussed, the job file includes a digital representation of the object, including a slice corresponding to the layer of the object. The slice includes a scanning pattern (e.g., scanning pattern 100).

The computing device can determine a spatial position of the energy source used to scan the layer of building material corresponding to the layer of the object based on the scanning pattern of the corresponding slice. In particular, as discussed, the scanning pattern may indicate the spatial position and direction to apply energy to the layer of building material. The computing device may further calculate the amount of energy to be applied by the energy source at each area that the energy is to be applied to the layer of building material.

For example, the computing device may calculate the energy to be applied by the energy source at each area based on the scanning pattern and operational parameters of the energy source. In particular, in some embodiments, the computing device uses the spatial position of the energy source, and optionally the beam shape and/or beam size (e.g., for a laser beam) or the accelerating voltage and/or current (e.g., for an electron beam), to determine the areas on the build material where energy is to be applied. Further, the computing device uses the scanning speed and/or direction the energy source is to be moved while scanning to determine a duration that the energy is to be applied at each area. The computing device then uses the power level of the energy source and the duration that the energy is to be applied at each area to determine the amount of energy to be applied at each area of the build material. For example, the computing device may multiply the duration energy is to be applied by the power level of the energy source for each area of the build material. In another example, the computing device may divide the power level of the energy source by the velocity (e.g., scanning speed) of the movement of the energy source over the build material for each area of the build material to determine the energy applied by the energy source at each area.

Figure 2:
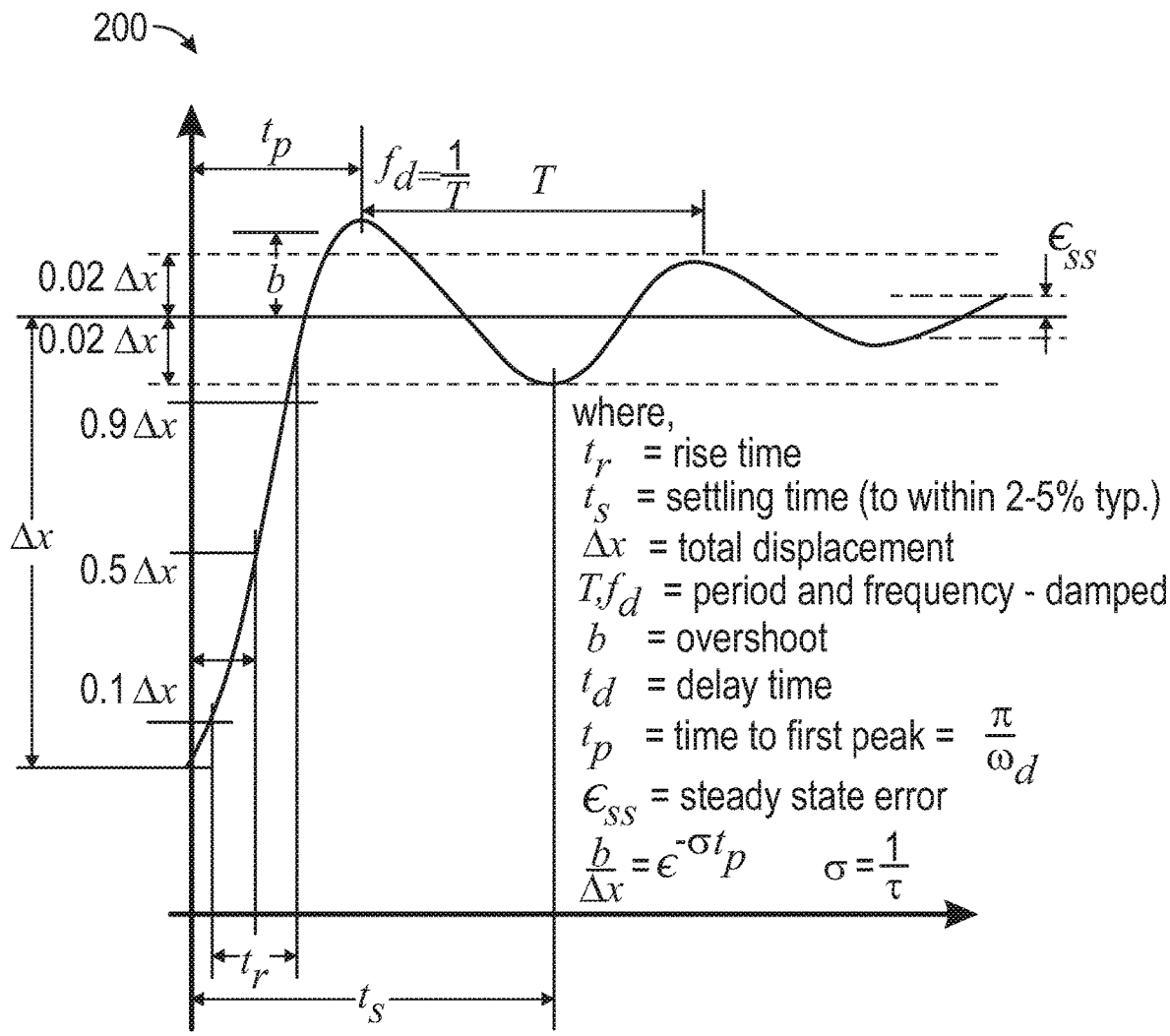
FIG. 2 is a graph that illustrates the various dynamic behaviors of an example energy source.

In some embodiments, the computing device generates an energy density map for a layer of an object based on the scanning pattern for the layer (e.g., in a job file) and operating parameters of the energy source of the additive manufacturing machine used to build the object, and further based on the dynamic behavior of the energy source. Dynamic behavior of the energy source may include a dynamic behavior of a scanner of the energy source, such as, movement of mirrors that steer a laser beam. Dynamic behavior of the energy source may also include dynamic behavior of the energy itself, such as a rise time and fall time of the power level of the energy source (e.g., laser). For example, the dynamic behavior of the energy source may include one or more of a rise time, a settle time, a delay time, an acceleration time, and a deceleration time of the energy source. FIG. 2 is a graph 200 that illustrates the various dynamic behaviors of an example energy source. In particular, the x-axis represents time, and the y-axis represents a power level of the energy source. For example, the rise time $t_r$ of the energy source may be the time for the energy source to reach a percentage (e.g., 98%) of the power level used for scanning the build material. The acceleration time of the energy source may be the time before a steady state scanning speed is reached. The delay time $t_d$ may be the time it takes for the energy source to start generating energy after receiving a command to generate energy. The settle time $t_s$ may be the time for the energy source to reach a steady state (e.g., within 2-5% of the power level used for scanning the build material). The deceleration time of the energy source may be the time before movement of the energy source is stopped.

The dynamic behavior may be used by the computing device, along with the previously discussed scanning pattern and operational parameters, to determine a duration that the energy is applied at each area, and a power level of the energy source applied at each area. As discussed previously, the computing device then uses the power level of the energy source and the duration that the energy is to be applied at each area to determine the amount of energy to be applied at each area of the build material. In another example, dynamic behavior may be used by the computing device, along with the previously discussed scanning pattern and operational parameters, to determine a velocity that the energy is applied at each area, and a power level of the energy source applied at each area. The computing device may divide the power level of the energy source by the velocity (e.g., scanning speed) of the movement of the energy source over the build material for each area of the build material to determine the energy applied by the energy source at each area. In some aspects, the velocity of the energy source is adapted based on the power level.

In some aspects, the dynamic behavior of the energy source for a particular energy source may be determined based on the energy source, and aspects of the additive manufacturing device including the energy source. In some aspects, a controller coupled to the additive manufacturing device and configured to control operation of the additive manufacturing device is configured to identify such dynamic behavior of the energy source and provide such information to the computing device. In some aspects, the controller itself is the computing device. In some aspects, the dynamic behavior of the energy source, and accordingly the estimated amount of energy may be determined without actually building the object.

Figure 3:
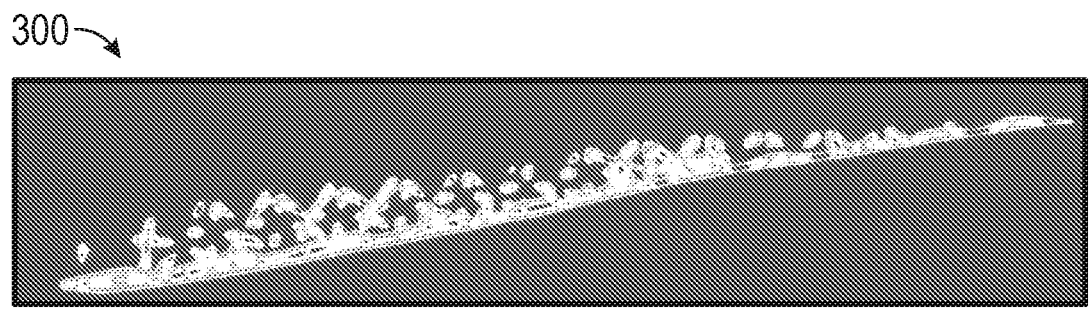
FIG. 3 illustrates an example of a visual representation of an energy density map for a layer of an object.

The computing device may accordingly determine the estimated amount of energy to be applied at each area of the layer of building material based on the scanning pattern and operational parameters of the energy source, and optionally dynamic behavior of the energy source. For example, the amount of energy may be represented as a number of Joules per area of build material (e.g., J/mm$^2$). The amounts of energy at each area may be compiled together and utilized to generate an energy density map that indicates the amount of energy to be applied at each area of the layer of building material. In some aspects, the estimated amount of energy may be determined without actually building the object. Such energy density maps calculated without actually building the object may be examples of pre-build energy density maps. Accordingly, the computing device determines how much energy is applied at every area of the layer of building material. In some embodiments, the energy density map for a layer comprises a set of values indicating an amount of energy correlated with a spatial location (e.g., coordinates, size, shape, etc.) of an area of the building material. FIG. 3 illustrates an example of a visual representation of an energy density map 300 for a layer of an object. The level of shading at each area of the density map 300 may indicate the energy density (e.g., amount of energy applied) at each area of the build material for the layer. For example, a darker shading indicates a higher energy density, and a lighter shading indicates a lower energy density. In some aspects, the computing device may visually display the energy density map 300 to a user (e.g., on a screen) to allow the user to identify potential critical sections of the object to be built (e.g., areas with too low or too high energy density).

In some embodiments, the pre-build energy density map is used as an input for simulation-based analyses. For example, a simulated build may be generated before the actual build, in order to predict errors or sub-optimal features of the build. The energy density map of layers in the build or sections of the build may be used as input for the simulation of the build. In certain embodiments, an energy density map may comprise energy density information for all slices in the build. Alternatively, the energy density map may comprise energy density information from a selection of slices. The computational burden for the simulation may be reduced, especially if the energy density map for the build comprises energy density calculations for volumes that represent a selection of the entire object, for example, a volume comprising two or more slices. While an energy density map comprising energy density calculations taken from each slice may be large, a smaller version of the energy density map for an object may comprise average energy density calculations taken from a volume containing a plurality of slices and not the entirety of all slices.

In some embodiments, in addition to or alternative to estimating the amount of energy to be applied at each area of the layer of building material based on the scanning pattern and operational parameters of the energy source, and optionally dynamic behavior of the energy source, as discussed, the computing device determines the actual amount of energy applied at each area. For example, the computing device may determine the actual amount of energy applied at each area to be used as a check on a quality of a part actually built, as a check of operation of the additive manufacturing device, as a check on whether to modify a job file if the estimated amount is different from the actual amount for subsequent builds of an object, etc. In some embodiments, a controller of an additive manufacturing device determines (e.g., logs, monitors, etc.) an actual position and/or velocity of the energy source, and optionally an actual power level of the energy source, over time during the build process while the object is built. The controller may provide the position information duration information, and/or velocity of application of the energy to the computing device. The computing device then determines the amount of energy actually applied at each area of the build material based on the power level of the energy source and the duration and/or velocity that the energy is applied at each area to determine the amount of energy applied at each area of the build material. The computing device may then generate an energy density map for the layer as discussed herein. Such energy density maps calculated based on information gathered when actually building the object may be examples of post-build energy density maps.

In some aspects, both pre-build energy density maps and post-build energy density maps be generated for an object. The post-build energy density maps may be compared to the pre-build energy density maps by a computing device to identify deviations between the different energy density maps. In some aspects, the deviations may be used by a computing device to determine if operation of the additive manufacturing device is faulty. For example, large deviations may be due to errors with the additive manufacturing device.

In further aspects, energy density maps may be generated during the build. In this manner, the actual energy density as the object is being built may be compared to a reference such as a predicted energy density, a pre-build energy density map, or a threshold. In locations the actual energy density map deviates from a reference, there may be a high probability of errors. In view of regions having a high probability of errors, the computing device may stop the build and/or take corrective actions.

Figure 4:
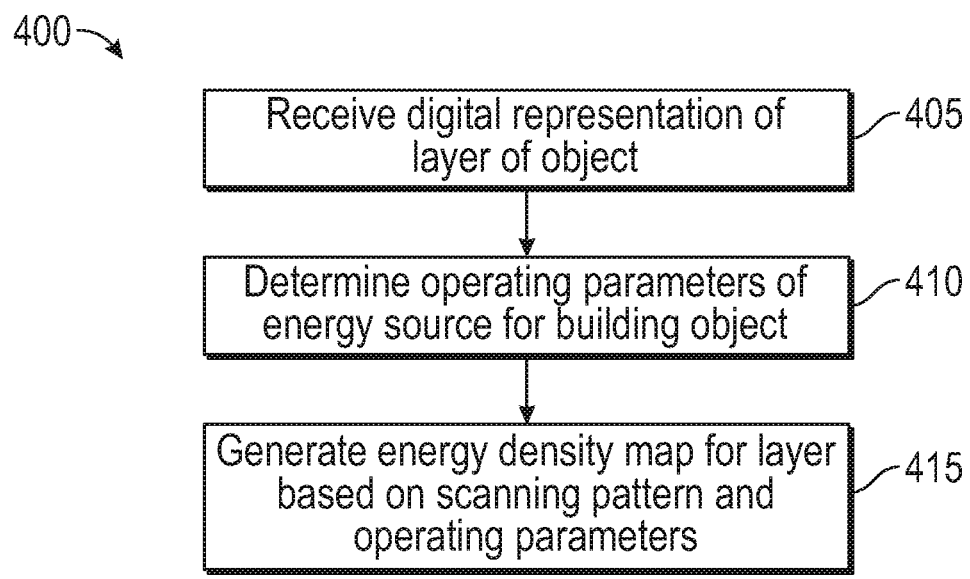
FIG. 4 illustrates example operations for generating an energy density map for a layer of an object, in accordance with certain aspects of the present disclosure.

FIG. 4 illustrates example operations 400 for generating an energy density map for a layer of an object, in accordance with certain aspects of the present disclosure. At 405, a digital representation of the layer of the object is received. For example, a computing device may receive a job file including a plurality of slices of a digital representation of the object. Each slice may represent a layer of the object. Further, each slice may indicate a scanning pattern (e.g., scanning lines for applying an energy source to build material to build the layer of the object) for the layer of the object. At 410, the operating parameters of an energy source for building the object are determined. For example, the computing device may determine one or more operating parameters of the energy source as discussed. Further, at 415, an energy density map of the layer of the object is generated based on the operational parameters of the energy source, and the scanning pattern of the layer of the object. The energy density map indicates an amount of energy from the energy source per area of build material applied to the build material for the layer of the object. In some aspects, the energy density map is further generated based on dynamic behavior of the energy source and/or the actual position of the energy source while actually building the object.

Figure 5:
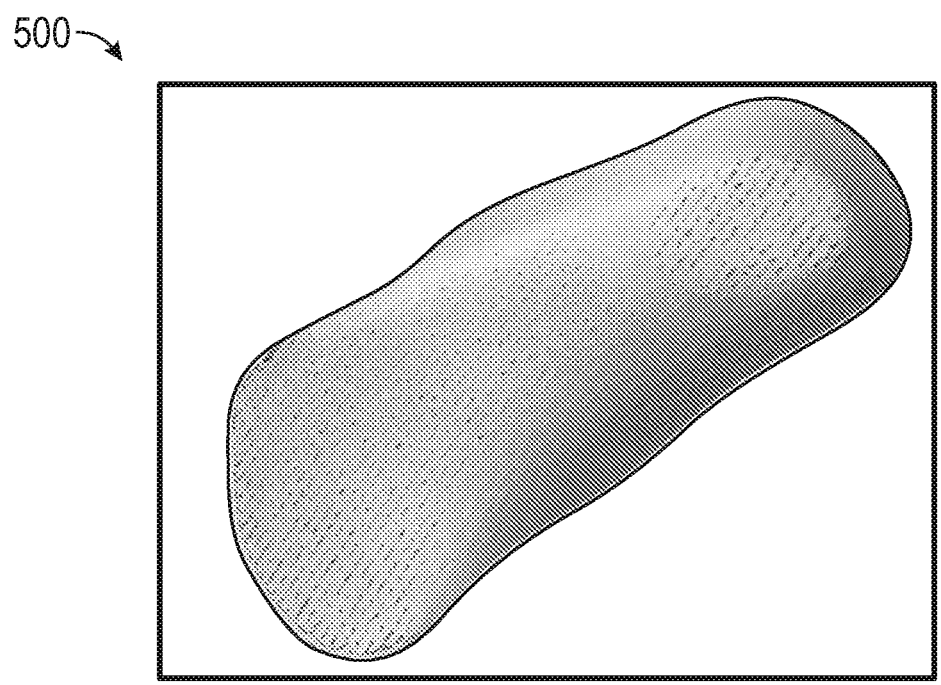
FIG. 5 illustrates an example of a visual representation of a 3D energy model of an object.

In some embodiments, the computing device may generate a 3D energy model (e.g., voxel model) based on the 2D energy density maps generated for each layer of an object. For example, the computing device may "stack" the energy density maps corresponding to each layer of the object in order to generate a 3D energy model of the object. In some aspects, the computing device may visually display the 3D energy model to a user (e.g., on a screen) to allow the user to identify potential critical sections of the object to be built (e.g., areas with too low or too high energy density). FIG. 5 illustrates an example of a visual representation of a 3D energy model of an object.

The 3D energy model may be a "stack" of selected layers (or slices) of the object. The 3D energy model may comprise a specific layer and one or more layers located in the z-direction directly above the specific layer. The 3D energy model may comprise a specific layer and one or more layers located in the z-direction directly below the layer. An energy density map, whether 2D or 3D, may comprise calculations made from entire layers or portions of layers, or any combination of these.

The computing device may further utilize the 2D energy density maps and/or 3D energy model of the object to identify critical sections (e.g., sections with potential for errors when building) of the object (e.g., areas or volumes). For example, the computing device may utilize the 2D energy density maps and/or 3D energy model of the object to identify sections (e.g., 2D areas or 3D volumes) of the object that may not be of sufficient quality and/or sections with geometrical non-conformities. In one example, the computing device may utilize the 2D energy density maps and/or 3D energy model of the object to determine a probability that a given section of the object has an error. In some aspects, the computing device may label a section a critical section if the probability that the given section of the object has an error is above a threshold.

In some embodiments, the computing device may further utilize the 2D energy density maps and/or 3D energy model of the object to adjust the build of such identified critical sections of the object. For example, application of energy from the energy source to the build material at identified critical sections of the object may be adjusted. For example, the scanning pattern, power level of the energy source, speed the energy source is moved while scanning, beam shape from the energy source, beam size, an accelerating voltage, and/or a current of the energy source from the energy source may be adjusted. In some embodiments, the scanning pattern may be adjusted by modifying the job file (e.g., including more or fewer scanning lines) at identified critical sections of the object. In some embodiments, the application of energy from the energy source to the build material at identified critical sections may be modified in an automated fashion by using computed probabilities for errors, or deviations from thresholds as an input to a function that calculates or adjusts the application of energy from the energy source.

In some embodiments, the probability that sections of an object to be built (e.g., based on a job file) include an error (e.g., possible defects or errors) may be determined utilizing the 3D energy model of the object. For example, in some aspects, the 3D energy model is a digital representation of a volume of the object. The computing device may divide the volume of the 3D energy model into a plurality of sections or regions, each having their own volume. The plurality of regions may each be of a uniform volume, or may be of different volumes. The computing device may then determine a probability for each region of the plurality of regions that the region includes an error. In some embodiments, if the probability for a region is above a threshold level, the computing device identifies the region as a critical region.

In some embodiments, the computing device calculates the overall amount of energy per volume in a given region based on the 3D energy model. For example, the amount of energy for each area in the given region is calculated and divided by the overall volume of the region. The computing device then compares the amount of energy per volume to at least one threshold. For example, if the amount of energy per volume of the region is below a first threshold energy amount, then the region may include a possible defect and be labeled a critical region. In another example, if the amount of energy per volume of the region is above a second threshold energy amount (different than the first threshold energy amount), then the region may include a possible defect and be labeled a critical region. In some aspects, the first threshold and/or second threshold may be the same for all regions of the object. For example, a lower bound and/or upper bound amount of energy may be determined for ensuring a particular build quality for the object. In some aspects, the first threshold and/or second threshold may be different for each region of the 3D energy model. For example, the thresholds for a region may be adaptive and based on the overall amount of energy per volume in regions near (e.g., adjacent) to the given region.

In some aspects, instead of immediately identifying a region as a critical region based on the comparison of the overall amount of energy per volume in the given region to one or more thresholds, the computing device uses the comparison to identify the regions as a potential critical region. In some aspects, the computing device then determines a probability that the potential critical region includes an error. For example, the computing device determines the probability that the potential critical region includes an error based on one or more of the volume of the region, an aspect ratio of the region, amounts of energy in surrounding regions, and the amount of energy in the given region. The computing device may determine the probability, for example, as a weighted calculation based on these factors.

For example, for regions identified as having an overall amount of energy per volume below a threshold, the larger the volume of the region, the higher the probability assigned, and the lower the volume of the region the lower the probability assigned. For example, a larger volume may have a higher probability that a defect is contained in the volume. In another example, for regions identified as having an overall amount of energy per volume below a threshold, the lower the aspect ratio of the region (e.g., lower disparity between the values of different dimensions of the region), the higher the probability assigned, and the higher the aspect ratio of the region the lower the probability assigned. For example, a region that is needle-like may have less probability of a defect than a spherical region. In a further example, for regions identified as having an overall amount of energy per volume below a threshold, the higher the amount of energy in surrounding regions (e.g., in a shell like region surrounding the region having a certain thickness), the lower the assigned probability, and the lower the amount of energy in surrounding regions, the higher the assigned probability. For example, if the amount of energy in surrounding regions is higher, it may partially compensate for a lower amount of energy in the given region. In another example, for regions identified as having an overall amount of energy per volume below a threshold, the lower the amount of energy per volume in the given region, the higher the assigned probability, and the higher the amount of energy per volume in the given region, the lower the assigned probability.

For example, for regions identified as having an overall amount of energy per volume above a threshold, the larger the volume of the region, the higher the probability assigned, and the lower the volume of the region the lower the probability assigned. For example, a larger volume may have a higher probability that a defect is contained in the volume. In another example, for regions identified as having an overall amount of energy per volume above a threshold, the lower the aspect ratio of the region (e.g., lower disparity between the values of different dimensions of the region), the higher the probability assigned, and the higher the aspect ratio of the region the lower the probability assigned. For example, a region that is needle-like may have lower probability of a defect than a spherical region. In a further example, for regions identified as having an overall amount of energy per volume above a threshold, the higher the amount of energy in surrounding regions (e.g., in a shell like region surrounding the region having a certain thickness), the higher the assigned probability, and the lower the amount of energy in surrounding regions, the lower the assigned probability in some instances. In another example, for regions identified as having an overall amount of energy per volume above a threshold, the lower the amount of energy per volume in the given region, the lower the assigned probability, and the higher the amount of energy per volume in the given region, the higher the assigned probability.

In some aspects, the probabilities for each region may be stored by the computing device and presented to a user. In some aspects, the probabilities for each region may be compared to a threshold and if the probability for a region is above a threshold level, the computing device identifies the region as a critical region.

In some embodiments, the computing device may determine potential critical areas for an object based on the 2D energy density maps for the object. For example, similar calculations as performed by the computing device for the 3D energy model may instead be performed in 2D utilizing the 2D energy density maps.

In some embodiments, the computing device determines the overall amount of energy per area in a given section of a layer based on the 2D energy density map of the layer. The computing device then compares the amount of energy per area to at least one threshold. For example, if the amount of energy per area of the section is below a first threshold energy amount, then the section may include a possible defect and be labeled a critical region. In another example, if the amount of energy per area of the section is above a second threshold energy amount (different than the first threshold energy amount), then the section may include a possible defect and be labeled a critical section. In some aspects, the first threshold and/or second threshold may be the same for all sections of the layer of the object. For example, a lower bound and/or upper bound amount of energy may be determined for ensuring a particular build quality for the object. In some aspects, the first threshold and/or second threshold may be different for each section of the 2D energy density map. For example, the thresholds for a section may be adaptive and based on the overall amount of energy per area in sections near (e.g., adjacent) to the given section.

In some aspects, instead of immediately identifying a section as a critical section based on the comparison of the overall amount of energy per area in the given section to one or more thresholds, the computing device uses the comparison to identify the section as a potential critical section. In some aspects, the computing device then determines a probability that the potential critical section includes an error. For example, the computing device determines the probability that the potential critical section includes an error based on one or more of the area of the section, amounts of energy in surrounding sections, and the amount of energy in the given section. The computing device may determine the probability, for example, as a weighted calculation based on these factors. For example, the larger the area of the section, the higher the probability assigned, and the lower the area of the section the lower the probability assigned. For example, a larger area may have a higher probability that a defect is contained in the area. In a further example, the higher the amount of energy in surrounding sections (e.g., in a shell like section surrounding the section having a certain thickness), the lower the assigned probability, and the lower the amount of energy in surrounding sections, the higher the assigned probability. For example, if the amount of energy in surrounding sections is higher, it may partially compensate for a lower amount of energy in the given section. In another example, the lower the amount of energy per area in the given section, the higher the assigned probability, and the higher the amount of energy per area in the given section, the lower the assigned probability.

In some aspects, the probabilities for each section may be stored by the computing device and presented to a user. In some aspects, the probabilities for each section may be compared to a threshold and if the probability for a section is above a threshold level, the computing device identifies the region as a critical section.

Figure 6:
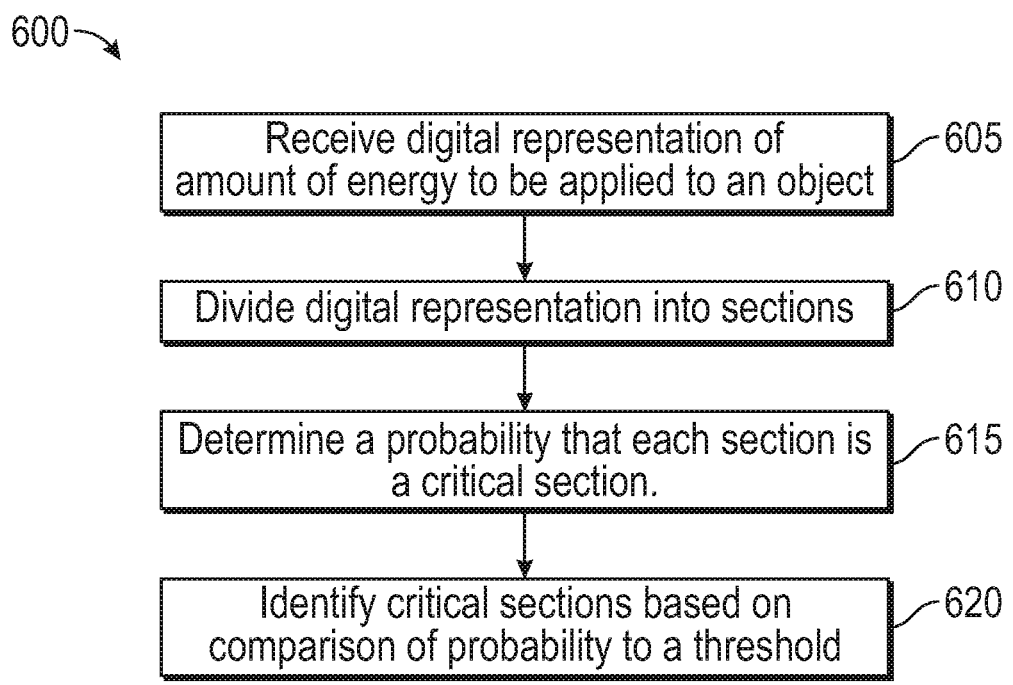
FIG. 6 illustrates example operations for identifying critical sections in an object, in accordance with certain aspects of the present disclosure.

FIG. 6 illustrates example operations 600 for identifying critical sections in an object, in accordance with certain aspects of the present disclosure. At 605, a digital representation of the amount of energy to be applied to the object is received. For example, a computing device may receive a 3D energy model of the object and/or a 2D energy density map of a layer of the object. At 610, the digital representation of the amount of energy to be applied to the object is received is divided into sections. For example, the computing device may divide the 3D energy model of the object and/or a 2D energy density map into sections with defined volumes or areas. At 615, a probability that the section is a critical section is determined. For example, as discussed, the probability that the section is a critical section may be determined based on one or more factors, such as the comparison of the amount of energy per volume or area of the section to one or more thresholds. At 620, any sections having a probability of being a critical section above a threshold are identified as critical sections.

In some embodiments, the probability that sections of an object to be built (e.g., based on a job file) include an error (e.g., possible defects or errors) may be determined utilizing the 3D energy model of the object to predict the real dimensions of the object when built by the additive manufacturing device. For example, the computing device may predict the real dimensions of the object to be built based on the 3D energy model of the object by scaling (e.g., in different spatial directions) a digital representation of the object based on the amount of energy applied to the object. In some aspects, the representation of the object may also be scaled (e.g., XY scaling applied) to correct for the thermal effect of manufacture. Any sections that are scaled outside the design limits for the object may be identified as geometrical non-conformities corresponding to critical sections.

In some embodiments, the computing device may further utilize the 2D energy density maps and/or 3D energy model of the object to adjust the build of identified critical sections of the object. For example, application of energy from the energy source to the build material at identified critical sections of the object may be adjusted. For example, the scanning pattern, power level of the energy source, speed the energy source is moved while scanning, beam shape from the energy source, beam diameter from the energy source, an accelerating voltage, and/or a current of the energy source may be adjusted. In some embodiments, the scanning pattern may be adjusted by modifying the job file (e.g., including more or fewer scanning lines) at identified critical sections of the object. In some embodiments, the application of energy from the energy source to the build material at identified critical sections may be modified in an automated fashion. For example, in sections (or for one or more vectors of those sections) identified as having a low energy density (e.g., the amount of energy per volume or area is below a first threshold), one or more of additional vectors may be added to the scanning pattern(s) for the section, one or more vectors of the scanning pattern(s) may be lengthened, one or more vectors of the scanning pattern(s) may be divided, the power level of the energy source for scanning in the section may be increased, the speed the energy source is moved in the section may be decreased, the beam size (e.g., diameter) of the energy source may be decreased (e.g., to concentrate more energy per area), the beam shape may be changed (e.g., to concentrate more energy per area), the current may be changed (e.g., increased), and/or the accelerating voltage may be changed (e.g., increased). In sections (or for one or more vectors of those sections) identified as having a high energy density (e.g., the amount of energy per volume or area is above a second threshold), one or more of vectors may be removed or shortened in the scanning pattern(s) for the section, one or more vectors of the scanning pattern(s) may be divided, the power level of the energy source for scanning in the section may be decreased, the speed the energy source is moved in the section may be increased, the beam size (e.g., diameter) of the energy source may be increased (e.g., to concentrate less energy per area), the beam shape may be changed (e.g., to concentrate less energy per area), the current may be changed (e.g., decreased), and/or the accelerating voltage may be changed (e.g., decreased).

Figure 7A:
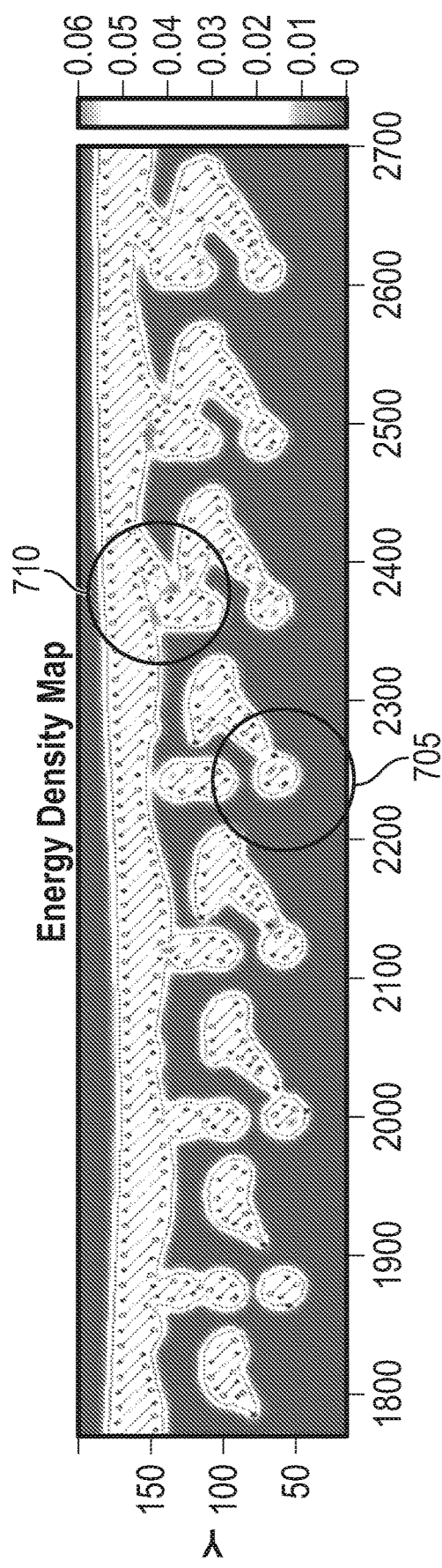
FIG. 7A illustrates an example of a visual representation of an energy density map for a layer of an object before adjusting the build of identified critical sections of the object.
Figure 7B:
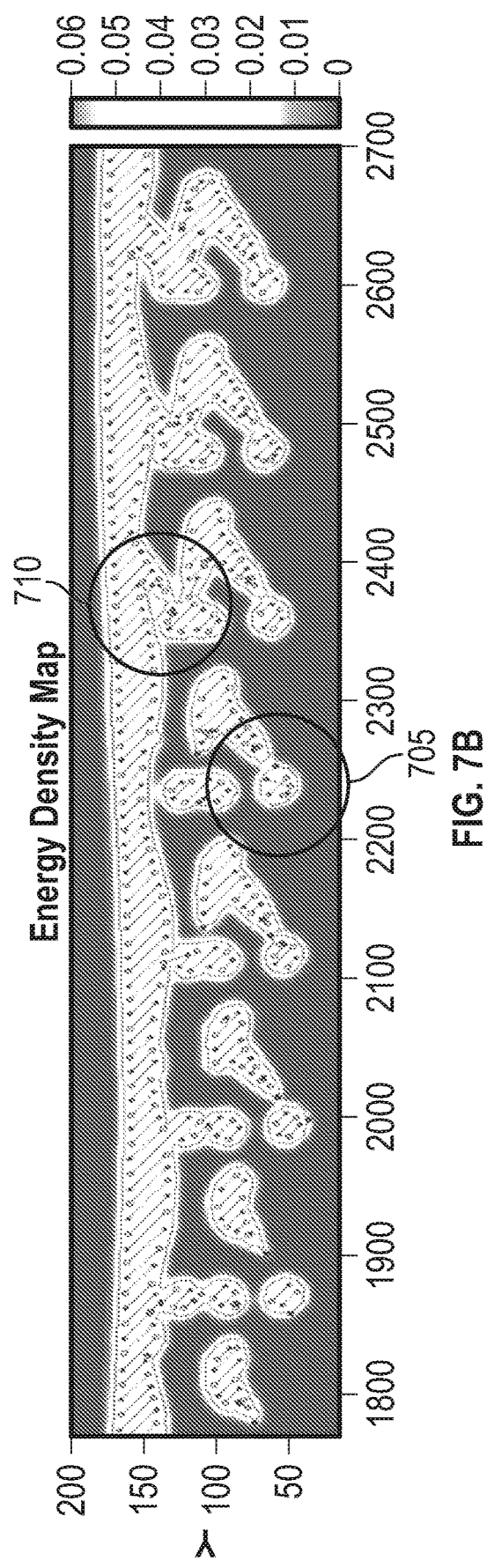
FIG. 7B illustrates an example of a visual representation of an energy density map for a layer of an object after adjusting the build of identified critical sections of the object.

For example, FIG. 7A illustrates an example of a visual representation of an energy density map for a layer of an object before adjusting the build of identified critical sections of the object. FIG. 7B illustrates an example of a visual representation of an energy density map for a layer of an object after adjusting the build of identified critical sections of the object. Each of the lines in the energy density maps represents scanning lines. As shown, the scanning lines have been adjusted between FIG. 7A and FIG. 7B. For example, in the circled region 705, additional scanning lines have been added to the energy density map of FIG. 7B. Further, in the circled region 710, scanning lines have been removed from the energy density map of FIG. 7B. Areas where scanning lines have been adjusted may be areas targeted for post-build inspection or post-processing.

In some aspects, where an identified critical section of an object to be built includes a difference between the predicted real dimensions of the object when built by the additive manufacturing device, and dimensions of the digital representation (e.g., CAD file, job file, etc.) of the object, the application of energy from the energy source to the build material at identified critical sections of the object may be adjusted so the predicted real dimensions of the object when built better align with the dimensions of the digital representation of the object.

In further aspects, energy density maps may be used to determine at least one region of interest (ROI). An ROI may be a critical region or critical section as described above. The ROI may have been previously identified as a critical section, for example, an area where the overall amount of energy per area in the given section was compared to one or more thresholds and determined to be a critical section with a high probability for errors. In this ROI, corrective actions may be taken, and then a new energy density map may be evaluated at the ROI. Alternatively, the ROI may be a zone that is susceptible to defects based on particular geometry, stresses such as thermal stresses, or other factors, and may be identified on the basis of other measurements or calculations than energy density. An example of such calculation is a model which predicts the thermal residual stress induced in laser melting of metals. In some embodiments, the ROI may be a zone identified as susceptible to defects but where energy density calculations do not indicate a high probability for errors related to energy density. Thus, it may be possible to eliminate energy density as a potential factor in the error. In certain embodiments, the energy density calculations may indicate that energy density is likely to be an underlying factor in susceptibility to errors, even though the ROI was previously identified using other measurements or calculations.

In some embodiments, the ROI may be a specific zone in which additional measurements for porosity, structural integrity, fatigue, etc., should be made. For example, CT scans may be performed on the ROI of an object, rather than on the full object. High-resolution scans may be performed on the ROI, while lower-resolution scans are performed on the remainder of the object. Finally, an ROI may be an area where post-processing procedures are performed, such as local heat treatment applied only to the ROI, for example to change volume properties at only this region or to change surface properties such as surface finish and/or surface porosity. ROI's as determined by energy density maps may be determined in an automated manner for a build and presented to the user, for example, in a visual display.

In certain embodiments, a region in an object is identified using at least one of a variety of measurements, after which energy density calculations are made in the region to confirm that the region has errors or is susceptible to errors. Exemplary measurements are temperature, melt pool dynamics, detection of features in images such as optical images, CT scans, IR images, and other measures of physical characteristics or dynamic behavior of the object. In some embodiments, sensors in the AM build chamber are used to make measurements during a build. When the actual measurements in a region deviate from expected measurements, energy density maps may be generated in order to confirm that the deviation may be expected in those regions, for example, because the object has regions of known susceptibility to error. Conversely, where deviation occurred but was not expected or easily explained by features in the object, the energy density maps may provide a second check for problems or possible errors.

In some aspects, determination of energy density maps for an object to be built may be used to decrease a scanning time for actually building the object. For example, a plurality of scanning strategies may be generated for the object by a computing device. A scanning strategy for the object may include the scanning pattern for each layer of the object. Different scanning strategies may have different scanning patterns for one or more layers of the object than each other. The time for building the object using each of the scanning strategies may be calculated by a computing device. Further, the energy density maps for each scanning strategy may be generated by a computing device. Accordingly, each scanning strategy includes an associated scanning time and an associated set of energy density maps (and optionally a 3D energy model). One of the scanning strategies for actually building the object may be selected based on a quality/uniformity of its energy density maps, and the scanning time. For example, in some aspects, some uniformity may be sacrificed for a faster scanning time. In some aspects, some time may be sacrificed for uniformity. In some aspects, the strategy with the fastest scanning time is selected and critical sections adjusted as discussed herein.

In certain aspects, the energy density maps may be used as a reference for further quality inspection. When an energy density map indicates that the amount of energy is within thresholds that will predict a low probability of errors, that energy density map may be used as a standard or reference comparison for building future objects. Accordingly, when energy density maps of objects being manufactured are substantially identical to the reference energy density map, the objects may be expected to have a low probability of errors. Energy density maps may also be used as a basis for a quality certification, for example, if a manufactured object is accompanied by its own energy density map indicating the low probability of errors, or by a comparison of its energy density map to a reference map. In some embodiments, an energy density map that indicates a low probability of errors may be used to verify that any errors in the object are the result of other factors and not energy density.

Figure 8:
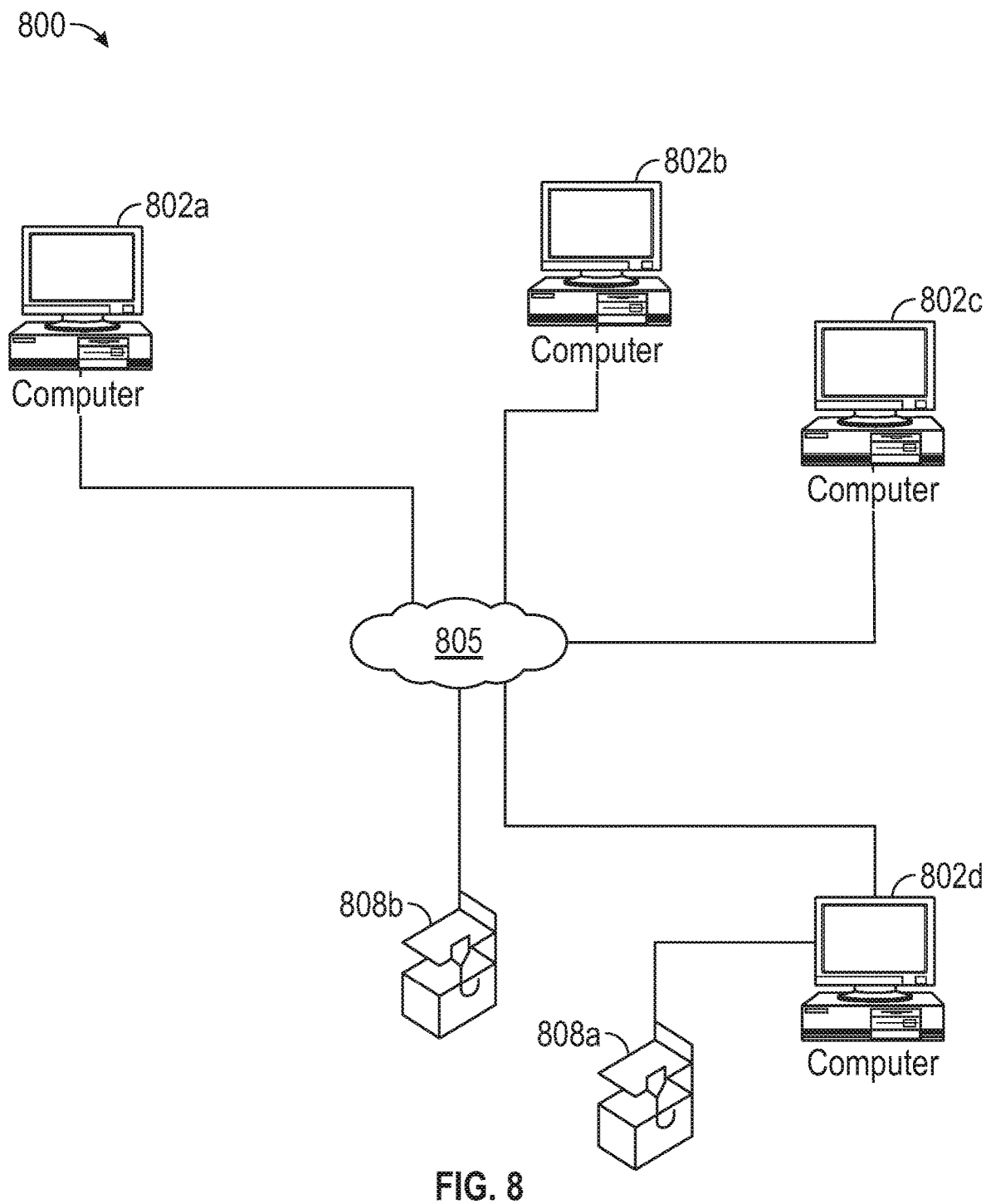
FIG. 8 is an example of a system for designing and manufacturing 3D objects.

Embodiments of the invention may be practiced within a system for designing and manufacturing 3D objects. Turning to FIG. 8, an example of a computer environment suitable for the implementation of 3D object design and manufacturing is shown. The environment includes a system 800. The system 800 includes one or more computers 802a-802d, which can be, for example, any workstation, server, or other computing device capable of processing information. In some aspects, each of the computers 802a-802d can be connected, by any suitable communications technology (e.g., an internet protocol), to a network 805 (e.g., the Internet). Accordingly, the computers 802a-802d may transmit and receive information (e.g., software, digital representations of 3-D objects, commands or instructions to operate an additive manufacturing device, etc.) between each other via the network 805.

The system 800 further includes one or more additive manufacturing devices (e.g., 3-D printers) 808a-808b. As shown the additive manufacturing device 808a is directly connected to a computer 802d (and through computer 802d connected to computers 802a-802c via the network 805) and additive manufacturing device 808b is connected to the computers 802a-802d via the network 805. Accordingly, one of skill in the art will understand that an additive manufacturing device 808 may be directly connected to a computer 802, connected to a computer 802 via a network 805, and/or connected to a computer 802 via another computer 802 and the network 805.

It should be noted that though the system 800 is described with respect to a network and one or more computers, the techniques described herein also apply to a single computer 802, which may be directly connected to an additive manufacturing device 808. Any of the computers 802a-802d may be configured to function as the computing device and/or controller described with respect to FIGS. 1-7. Further, any of the computers 802a-802d may be configured to perform the operations described herein, including the operations 400 and 600 described with respect to FIGS. 4 and 6.

Figure 9:
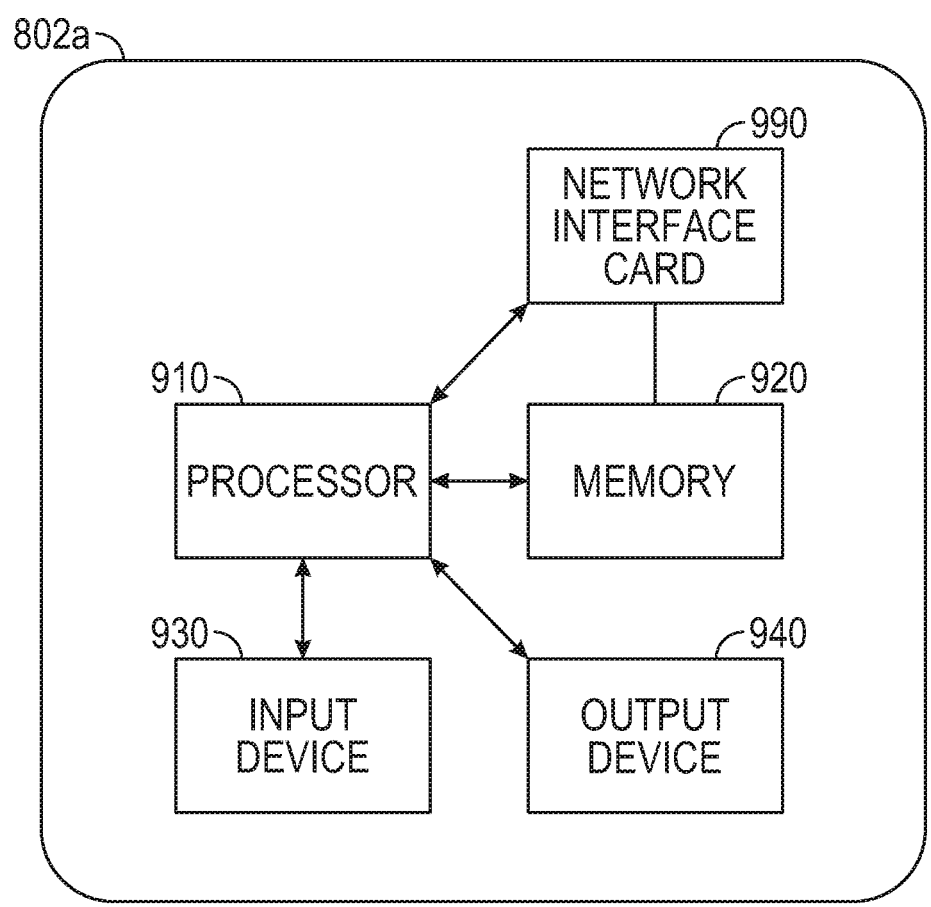
FIG. 9 illustrates a functional block diagram of one example of the computer shown in FIG. 8.

FIG. 9 illustrates a functional block diagram of one example of a computer of FIG. 8. The computer 802a includes a processor 910 in data communication with a memory 920, an input device 930, and an output device 940. In some embodiments, the processor is further in data communication with an optional network interface card 990. Although described separately, it is to be appreciated that functional blocks described with respect to the computer 502a need not be separate structural elements. For example, the processor 910 and memory 920 may be embodied in a single chip.

The processor 910 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 910 can be coupled, via one or more buses, to read information from or write information to memory 920. The processor may additionally, or in the alternative, contain memory, such as processor registers. The memory 920 can include processor cache, including a multi-level hierarchical cache in which different levels have different capacities and access speeds. The memory 920 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 910 also may be coupled to an input device 930 and an output device 940 for, respectively, receiving input from and providing output to a user of the computer 802*a*. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 910 further may be coupled to a network interface card 990. The network interface card 990 prepares data generated by the processor 910 for transmission via a network according to one or more data transmission protocols. The network interface card 990 also decodes data received via a network according to one or more data transmission protocols. The network interface card 990 can include a transmitter, receiver, or both. In other embodiments, the transmitter and receiver can be two separate components. The network interface card 990, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 10:
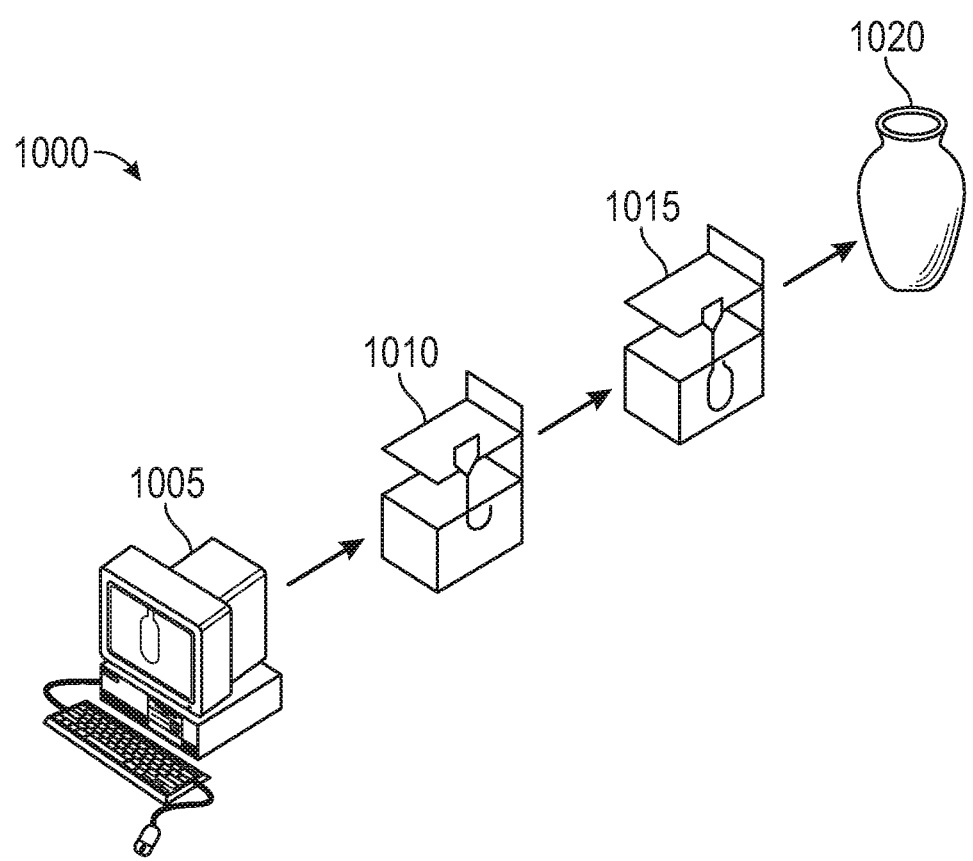
FIG. 10 shows a high level process for manufacturing a 3D object using an additive manufacturing system.

FIG. 10 illustrates a process 1000 for manufacturing a 3-D object or device. As shown, at a step 1005, a digital representation of the object is designed using a computer, such as the computer 802*a*. For example, 2-D or 3-D data may be input to the computer 802*a* for aiding in designing the digital representation of the 3-D object. Continuing at a step 1010, information is sent from the computer 802*a* to an additive manufacturing device, such as additive manufacturing device 808, and the device 808 commences the manufacturing process in accordance with the received information. At a step 1015, the additive manufacturing device 808 continues manufacturing the 3-D object using suitable materials, such as a liquid resin. At a step 1020, the object is finally built.

These suitable materials may include, but are not limited to a photopolymer resin, polyurethane, methyl methacrylate-acrylonitrile-butadiene-styrene copolymer, resorbable materials such as polymer-ceramic composites, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESD7, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3-Systems; the PA line of materials, PrimeCast and PrimePart materials and Alumide and CarbonMide from EOS GmbH. The VisiJet line of materials from 3-Systems may include Visijet Flex, Visijet Tough, Visijet Clear, Visijet HiTemp, Visijet e-stone, Visijet Black, Visijet Jewel, Visijet FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series. Further, at a step 820, the 3-D object is generated.

Various embodiments disclosed herein provide for the use of a controller or computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method for building an object utilizing additive manufacturing, the method comprising:
receiving, at a processor, a job file for building the object, wherein the job file includes a plurality of slices of the object, and wherein a first slice of the object indicates scanning lines for applying an energy source to build material to build the first slice of the object;
determining, by the processor, operation parameters of the energy source, wherein the energy source comprises a laser or electron beam, and wherein the operation parameters of the energy source further comprise a size of the beam of the energy source;
generating, by the processor, a first energy density map of the first slice of the object based on the job file and the operation parameters of the energy source, wherein the first energy density map indicates an amount of energy from the energy source per area of build material applied to the build material for the first slice of the object;

determining a potential non-conformity in building the object when at least a portion of an area of the first energy density map has an energy level that is at least one of below a first threshold or above a second threshold; and adjusting application of the energy source to build material corresponding to the at least the portion of the area of the first energy density map based on determining the potential non-conformity.

2. The method of claim 1, wherein the operation parameters of the energy source comprise at least one of a power of the energy source, a scanning speed of the energy source, a shape of a beam of the energy source, a current, or an acceleration voltage.

3. The method of claim 1, wherein the scanning lines comprise vectors indicating positions and directions to apply the energy source to the build material.

4. The method of claim 1, further comprising:
determining dynamic behavior of the energy source, dynamic behavior comprising at least one of a rise time, a settle time, a delay time, an acceleration time, or a deceleration time of the energy source along the scanning lines, and wherein generating the first energy density map of the object is further based on the dynamic behavior of the energy source.

5. The method of claim 1, further comprising:
building the object based on the job file; and
logging actual positions of the energy source over time while building the object, wherein generating the first energy density map of the object is further based on the actual positions of the energy source as applied to the first slice of the object over time.

6. The method of claim 1, further comprising:
generating a plurality of energy density maps of the plurality of slices of the object based on the job file and the operation parameters of the energy source; and
generating a three dimensional energy distribution of the object based on the plurality of energy density maps;
wherein the determining the potential non-conformity in building the object when the at least a portion of the area of the first energy density map has the energy level that is at least one of below the first threshold or above the second threshold comprises determining the potential non-conformity when a portion of a volume of the three dimensional energy distribution has an energy level that is at least one of below the first threshold or above the second threshold.

7. The method of claim 6,
wherein the adjusting application of the energy source to build material corresponding to the at least the portion of the area comprises adjusting application of the energy source to build material corresponding to the portion of the volume of the three dimensional energy distribution based on determining the potential non-conformity, wherein adjusting application of the energy source comprises at least one of adjusting the scanning lines, adjusting a power level of the energy source, adjusting a speed of the energy source, adjusting a beam shape of the energy source, or adjusting the size of the beam of the energy source.

8. The method of claim 6, further comprising:
estimating geometrical non-conformities of the object based on the three dimensional energy distribution;
wherein the adjusting comprises adjusting application of the energy source to build material corresponding to the estimated geometrical non-conformities, wherein adjusting application of the energy source comprises at least one of adjusting the scanning lines, adjusting a power level of the energy source, adjusting a speed of the energy source, adjusting a beam shape of the energy source, or adjusting the size of the beam of the energy source.

9. The method of claim 6, wherein determining a potential non-conformity is further based on at least one of a size of the portion of the volume, an aspect ratio of the portion of the volume, or energy levels in other portions of the volume.

10. The method of claim 1, wherein adjusting application of the energy source comprises at least one of adjusting the scanning lines, adjusting a power level of the energy source, adjusting a speed of the energy source, adjusting a beam shape of the energy source, or adjusting the size of the beam of the energy source.

11. The method of claim 1, wherein the adjusting comprises adjusting application of the energy source to build material corresponding to a determined geometrical non-conformity, wherein adjusting application of the energy source comprises at least one of adjusting the scanning lines, adjusting a power level of the energy source, adjusting a speed of the energy source, adjusting a beam shape of the energy source, or adjusting the size of the beam of the energy.

12. The method of claim 1, wherein adjusting application of the energy source comprises adjusting the scanning lines comprising shortening, lengthening, adding, or deleting vectors of the scanning lines.

13. An apparatus for building an object utilizing additive manufacturing, the apparatus comprising:
a memory; and
a processor configured to:
receive a job file for building the object, wherein the job file includes a plurality of slices of the object, and wherein a first slice of the object indicates scanning lines for applying an energy source to build material to build the first slice of the object;
determine operation parameters of the energy source, wherein the energy source comprises a laser or electron beam, and wherein the operation parameters of the energy source further comprise a size of the beam of the energy source;
generate a first energy density map of the first slice of the object based on the job file and the operation parameters of the energy source, wherein the first energy density map indicates an amount of energy from the energy source per area of build material applied to the build material for the first slice of the object;
determine a potential non-conformity in building the object when at least a portion of an area of the first energy density map has an energy level that is at least one of below a first threshold or above a second threshold; and
adjust application of the energy source to build material corresponding to the at least the portion of the area of the first energy density map based on determining the potential non-conformity.

14. A computer-readable storage medium having instructions stored thereon, that when executed by a processor, cause the processor to perform a method for building an object utilizing additive manufacturing, the method comprising:

receiving, at the processor, a job file for building the object, wherein the job file includes a plurality of slices of the object, and wherein a first slice of the object indicates scanning lines for applying an energy source to build material to build the first slice of the object;

determining, by the processor, operation parameters of the energy source, wherein the energy source comprises a laser or electron beam, and wherein the operation parameters of the energy source further comprise a size of the beam of the energy source;

generating, by the processor, a first energy density map of the first slice of the object based on the job file and the operation parameters of the energy source, wherein the first energy density map indicates an amount of energy from the energy source per area of build material applied to the build material for the first slice of the object;

determining a potential non-conformity in building the object when at least a portion of an area of the first energy density map has an energy level that is at least one of below a first threshold or above a second threshold; and adjusting application of the energy source to build material corresponding to the at least the portion of the area of the first energy density map based on determining the potential non-conformity.

* * * * *